US009486732B2

(12) United States Patent
Barrett et al.

(10) Patent No.: US 9,486,732 B2
(45) Date of Patent: Nov. 8, 2016

(54) ADSORBENT COMPOSITIONS

(71) Applicants: Philip Alexander Barrett, Tonawanda, NY (US); Steven John Pontonio, Eden, NY (US); Persefoni Kechagia, Williamsville, NY (US); Neil Andrew Stephenson, East Amherst, NY (US); Kerry C. Weston, Coxs Creek, KY (US)

(72) Inventors: Philip Alexander Barrett, Tonawanda, NY (US); Steven John Pontonio, Eden, NY (US); Persefoni Kechagia, Williamsville, NY (US); Neil Andrew Stephenson, East Amherst, NY (US); Kerry C. Weston, Coxs Creek, KY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 13 days.

(21) Appl. No.: 14/703,999

(22) Filed: May 5, 2015

(65) Prior Publication Data

US 2015/0231553 A1 Aug. 20, 2015

Related U.S. Application Data

(63) Continuation of application No. 13/923,096, filed on Jun. 20, 2013, now Pat. No. 9,050,582, which is a continuation-in-part of application No. 13/530,236, filed on Jun. 22, 2012, now abandoned.

(51) Int. Cl.
| | |
|---|---|
| *B01J 20/02* | (2006.01) |
| *B01D 53/04* | (2006.01) |
| *B01D 53/047* | (2006.01) |
| *B01J 20/28* | (2006.01) |
| *B01J 20/18* | (2006.01) |

(52) U.S. Cl.
CPC ......... *B01D 53/0476* (2013.01); *B01D 53/047* (2013.01); *B01D 53/0462* (2013.01); *B01J 20/18* (2013.01); *B01J 20/2803* (2013.01); *B01J 20/28011* (2013.01); *B01J 20/28085* (2013.01); *B01D 2253/108* (2013.01); *B01D 2253/1085* (2013.01); *B01D 2253/11* (2013.01); *B01D 2257/102* (2013.01)

(58) Field of Classification Search
CPC ........... B01D 53/0462; B01D 53/047; B01D 53/0476; B01D 2253/108; B01D 2253/11; B01D 2253/1085; B01D 2257/102; B01J 20/28004; B01J 20/28011; B01J 20/2803; B01J 20/28085; B01J 20/18
USPC ............ 95/96, 130, 900, 902; 502/400, 407, 502/414, 439, 79
See application file for complete search history.

(56) References Cited

U.S. PATENT DOCUMENTS

| | | | |
|---|---|---|---|
| 3,795,631 | A | 3/1974 | Heinze et al. |
| 5,633,217 | A | 5/1997 | Lynn |
| 5,672,195 | A | 9/1997 | Moreau et al. |
| 6,171,370 | B1 | 1/2001 | Hirano et al. |

(Continued)

FOREIGN PATENT DOCUMENTS

| | | |
|---|---|---|
| DE | 19826209 A1 | 12/1999 |
| GB | 827043 | 3/1960 |

*Primary Examiner* — Frank Lawrence
(74) *Attorney, Agent, or Firm* — Ralph J. Mancini

(57) ABSTRACT

Adsorbent compositions useful in adsorption and separation processes are made using silicone-derived binding agents. The adsorbent compositions are made from crystallite aluminosilicate particles bound with silicone-derived binding agents, and optionally small amounts of a clay binder, to form agglomerated crystallite particles and are calcined to volatilize the organic components associated with the silicone-derived binding agents. The agglomerated crystallite particles have superior pore structures and superior crush strengths at low binder concentrations and exhibit enhanced $N_2$ adsorption rates and capacities when used in air separation processes.

11 Claims, 4 Drawing Sheets

(56) References Cited

U.S. PATENT DOCUMENTS

| | | |
|---|---|---|
| 6,423,658 B1 | 7/2002 | Thonnelier et al. |
| 6,425,940 B1 | 7/2002 | Chao et al. |
| 6,458,187 B1 | 10/2002 | Fritz et al. |
| 6,500,234 B1 | 12/2002 | Ackley et al. |
| 6,652,626 B1 | 11/2003 | Plee |
| 6,790,260 B2 | 9/2004 | Ackley et al. |
| 7,300,905 B2 | 11/2007 | Keefer et al. |
| 7,572,749 B2 * | 8/2009 | Beeckman ............ B01J 20/183 502/159 |
| 7,582,583 B2 | 9/2009 | Bosch et al. |
| 8,123,835 B2 | 2/2012 | Zheng et al. |
| 8,680,344 B2 | 3/2014 | Weston et al. |
| 8,728,218 B2 | 5/2014 | Knapp et al. |
| 2005/0119112 A1 | 6/2005 | Pfenninger et al. |
| 2006/0046929 A1 | 3/2006 | Hofstadt et al. |
| 2006/0272501 A1 | 12/2006 | Plee |
| 2008/0033212 A1 | 2/2008 | Bosch et al. |
| 2011/0104494 A1 | 5/2011 | Brandt et al. |
| 2012/0118160 A1 | 5/2012 | Heffes et al. |
| 2013/0340612 A1 | 12/2013 | Ackley et al. |

* cited by examiner

ADSORBENT COMPOSITIONS

CROSS REFERENCE TO RELATED APPLICATIONS

This is a continuation of continuation-in-part application Ser. No. 13/923,096 filed Jun. 20, 2013 and now issued as U.S. Pat. No. 9,050,582, and claims the benefit of U.S. patent application Ser. No. 13/530,236 filed Jun. 22, 2012, and now abandoned the disclosure of which is incorporated by reference herein.

FIELD OF INVENTION

The present invention is directed to novel adsorbent compositions useful in adsorption and gas separation processes. More particularly, the invention is directed to adsorbents made from agglomerated crystallite particles bound with silicone-derived binding agents and optionally small amounts of a clay binder. The present adsorbents have superior pore structures and superior crush strengths at low binder concentrations and exhibit enhanced $N_2$ adsorption rates and capacities when used in air separation processes.

BACKGROUND OF THE INVENTION

The adsorbents of this invention are useful in the adsorption and separation of gases. Preferably, the adsorbent compositions are used in processes for separating $N_2$ from mixtures containing $N_2$ and other gases by contacting the mixture with an adsorbent composition which selectively adsorbs the $N_2$ with one or more of the less strongly adsorbable components recovered as product.

Of particular interest is the use of these adsorbents in non-cryogenic gas separation processes. For example, the separation of nitrogen from gas mixtures is the basis for several industrial adsorption processes, including the production of oxygen from air. In the cyclic production of oxygen from air, air is passed through an adsorbent bed having a preference for the adsorption of nitrogen molecules and leaving oxygen and argon (the less strongly adsorbable components) to be produced. The adsorbed nitrogen is then desorbed through a purging step, normally through a change in pressure, including vacuum, and/or through temperature changes to regenerate the adsorbent and the cycle is repeated. Such processes include pressure swing adsorption (PSA), temperature swing adsorption (TSA), vacuum swing adsorption (VSA) and vacuum pressure swing adsorption (VPSA) processes and such processes are commonly used in commercial air separation operations as well as in other industrial processes.

Clearly the particular adsorbent used in these processes is an important factor in achieving an efficient, effective and competitive process. The performance of the adsorbent is dependent on several factors, including the adsorption capacity for the $N_2$, the selectivity between gases, which will impact the production yield, the adsorption kinetics, which will enable the adsorption cycle times to be optimized to improve the productivity of the process. The crush strength/attrition rate of the agglomerated particles is also very important particularly with respect to achieving a satisfactory adsorbent life in the adsorption process and system. Many of these factors are directly dependent on the particle pore structure and overall pore architecture.

The present invention is directed to novel adsorbent compositions, comprised of agglomerated adsorbent particles composed of at least one active component and a silicone-derived binding agent. The adsorbents produced therefrom show a surprising increase in adsorption capacity versus state of the art clay compositions. Additionally, the adsorbents are engineered during the manufacturing process to enhance their adsorption rate (kinetic) properties through improved composition (i.e. very high active phase concentration) and pore-structure architecture. Such adsorbents have high crush strength values and higher adsorption rate properties and are especially enabling for PSA/TSA/VSA/VPSA process intensification, a term commonly used to describe fast cycles with high rate adsorbents. When effectively used in these adsorption processes, such adsorbents lead to lower capital costs, reduced power consumption and/or increased product recovery.

Conventional agglomerated adsorbents used for such processes are composed of zeolite powders (crystallite particles), including ion exchanged zeolite powders depending on the process and binding agent. The binding agent is intended to ensure the cohesion of the agglomerated particles which are generally in the form of beads, pellets, and extrudates. Binding agents generally have no adsorbing property and their only function is to give the agglomerated particles sufficient mechanical strength to withstand the rigors of deployment in packed bed adsorption systems and the vibrations and stresses to which they are subjected to during the particular adsorption process, such as pressurization and depressurization. The particular binding agent and its concentration impact the final pore structure of the agglomerated particles thereby affecting the adsorbent's properties. It is known that the binding agent concentration should be as low as possible to reduce mass transfer resistances that can be negatively impacted from excess binder being present in the pores. Certain binding agents, temporary binders and other processing aids can also fill or otherwise partially plug the particle pores while other binding agents can have an adverse effect on the final pore structure depending on the particular binding agents' carrier solvents.

One of the most common methods to obtain agglomerated adsorbent particles with low binder concentrations, improved pore architectures and low mass transfer resistances is to use the caustic digestion method to prepare binderless adsorbents. Binderless adsorbents represent one approach to obtain a low binder content, but at the expense of additional manufacturing steps and higher costs. The conventional approach for caustic digestion is to employ clay binding agents that can be converted to active adsorbent material via the caustic treatment. Several prior disclosures have claimed novel pore structures and demonstrated various levels of improvement to the adsorption rate properties from the use of these binderless adsorbents.

For example, U.S. Pat. No. 6,425,940 B1 describes a high rate adsorbent made substantially binderless and having a median pore diameter >0.1 µm and in some cases a bimodal pore distribution having larger, 2-10 micron, pores engineered by using combustible fibers such as nylon, rayon and sisal, added during the forming process. In U.S. Pat. No. 6,652,626 B1, a process for producing agglomerated bodies of zeolite X is described wherein a binder containing at least 80% of a clay convertible to zeolite is contacted after calcination with a caustic solution to obtain an agglomerated zeolite material composed of at least 95% of an Li exchange zeolite X, having an Si/Al=1. The products are reported to have $N_2$ capacities at 1 bar, 25° C. of 26 ml/g which corresponds to less than 26 ml/g at 1 atm and 27° C. No pore structure or diffusivity information is disclosed. In U.S. Patent Application Publication No. 2011/104494, a zeolite based adsorbent granulate is disclosed, comprising a zeolite of the Faujasite structure and having a molar $SiO_2/Al_2O_3$ ratio ≥2.1-2.5. The adsorbent granulate has a mean transport pore diameter of >300 nm and a mesopore fraction of <10% and preferably <5%. The adsorbent granulate is prepared by mixing an X-type zeolite with a thermally treated kaoline clay in the presence of sodium silicate, sodium aluminate and sodium hydroxide.

A significant drawback to the manufacture of these binderless adsorbents is their high manufacturing cost due to additional processing steps, reagents and time required for the binder conversion. Another disadvantage of making binderless adsorbents stems from the need to handle, store and dispose of large quantities of the highly caustic solutions required in the adsorbent manufacturing process. This adds costs and environmental concerns to the process.

Another class of prior adsorbents teaches novel pore architectures through the use of novel binding agents or traditional binding agents with improved agglomeration processing. U.S. Pat. No. 6,171,370 B1 discloses an adsorbent showing utility in a PSA process which is characterized by having macropores with average diameter greater than the mean free path of an adsorbable component, when desorbing said component, and wherein at least 70% of the macropore volume is occupied by macropores having a diameter equal to or greater than the mean free path of the adsorbable component. The use of clay binders including attapulgite and sepiolite in concentrations of 5-30 wt % is described. U.S. Pat. No. 8,123,835 B2 describes the use of colloidal silica binders to produce superior adsorbents for gas separation applications including air separation. This teaching uses colloidal silica binding agents yielding macropores substantially free of binding agent. The adsorbents are characterized by an adsorption rate, expressed in the form of size compensated relative rate/porosity, of at least 4.0 mmol mm$^2$/gs. The binder content is less than or equal to 15 wt % and the mean crush strength is greater than or equal to 0.9 lbF measured on particles having a mean size of 1.0 mm.

Other teachings use silicones as the binder precursor in various catalysts and related shaped bodies, such as honeycomb catalyst structures. For example, U.S. Pat. No. 7,582,583 B2 teaches shaped bodies, such as honeycomb structures, containing microporous material and one silicon-containing binder used for the production of Triethylenediamine (TEDA). The catalyst is formed by mixing the microporous material, the binder, a make-up aid and the solvent; forming, drying and calcining the structure. The make-up aid is cellulose or cellulose derivative, and the solvent can be selected from a list of various organic solvents. U.S. Pat. No. 5,633,217 teaches a method of making a catalyst, catalyst support or adsorber body by forming a mixture of ceramic and/or molecular sieves, silicone resin, a dibasic ester solvent, organic binder, and water. The mixture is shaped into a green body, dried and heated. U.S. Pat. No. 6,458,187 teaches a shaped zeolite-containing body prepared from a particular class of siloxane-based binders in combination with zeolite, plasticizing agent, and methylcellulose. The body is formed by mixing the components and calcinined at temperatures below 300° F. so as not to volatilize the methyl cellulose or other volatiles.

According to this invention, adsorbents for gas separation processes are provided which are made from free-flowing agglomerated particles. These adsorbents have high $N_2$ adsorption rates, high $N_2$ adsorption capacities, high crush strengths and attrition resistance, and are bound with low concentrations of total binding agents using less costly and traditional manufacturing processes. Further, the adsorbent compositions are characterized by a $N_2$ adsorption capacity at 27° C. and 1 atm which is greater than an equivalent composition containing all clay binding agents.

BRIEF SUMMARY OF THE INVENTION

The present invention provides superior agglomerated adsorbent compositions useful in adsorption and separation processes including cyclic gas separation processes such as air separation. These adsorbents are comprised of active adsorbent materials such as aluminosilicate powders or crystallites which are agglomerated using low concentrations of a silicone-derived binding agent. Optionally, a granulation seed process is utilized for the production of the commercial adsorbent composition, wherein the seed comprises less than 25% by volume of the total adsorbent composition. The composition of the seed comprises an aluminosilicate powder or crystallite and a binder comprising a silicon-derived binding agent and/or clay, and, when clay is used, the clay comprises less than 3% by weight of the adsorbent composition. The agglomerated particles exhibit high crush strength values, superior pore structures and connectivity, and enhanced adsorption rate and capacity properties.

In one embodiment, a heat treated adsorbent composition is provided comprising a mixture of at least one active material and a silicone-derived binding agent formed as agglomerated particles comprised of 90% or more of the at least one active material calculated on a dry weight final product basis and having a median pore diameter of equal to or greater than 0.45 μm, 10% or less of the macropores and mesopores are of less than or equal to 0.1 μm, a hysteresis factor of equal to or greater than 0.6, and a crush strength value of equal to or greater than that obtained from the value determined by the relationship y=1.2x−0.3 where y is the mean crush strength in lbF and x is the mean particle size in mm. Further, the adsorbent composition comprising agglomerated crystallite zeolite particles bound with a silicone-derived binding agent and a clay binder in concentrations of not more than 1 part clay binder to 5 parts silicone binding agent and with the crystallite zeolite particles comprising one or more type X zeolite having a $SiO_2/A_{l2}O_3$ ratio of less than or equal to 2.5 have substantially no visible silicone-derived binding agent in the pores of the agglomerated particles when viewed under a SEM at 4500× magnification.

In yet another embodiment, an adsorption process is provided for separating $N_2$ from a gas mixture containing $N_2$ and at least one less strongly adsorbable component comprising contacting the mixture with an adsorbent composition which selectively adsorbs the $N_2$ and the at least one less strongly adsorbable component is recovered as product; the adsorbent composition comprising free-flowing agglomerated particles of a type X zeolite bound together by a silicone-derived binding agent and wherein the $N_2$ capacity of the composition is equal to or greater than 26 ml/g at 1 atm and 27° C.

In another embodiment, a method for manufacturing an agglomerated adsorbent composition is provided comprising:

(a) preparing a mixture comprising one or more active zeolite materials and a silicone derived binding agent,
(b) mixing seed material comprising one or more of the active zeolite materials and a clay binder with the mixture and water to form agglomerated adsorbent particles, (c) drying the agglomerated adsorbent particles,
(d) calcining the dried agglomerated adsorbent particles to form a calcined composition and optionally,
(e) rehydrating the calcined composition to form rehydrated agglomerated adsorbent particles,
(f) treating the rehydrated agglomerated adsorbent particles with a metal salt solution to effect an ion exchange of the cations to form ion exchanged agglomerated adsorbent particles, and
(g) drying and activating the ion exchanged particles by heating under dry purge gas the ion exchanged agglomerated particles to form the agglomerated adsorbent composition.

DETAILED DESCRIPTION OF THE INVENTION

Figure 1:
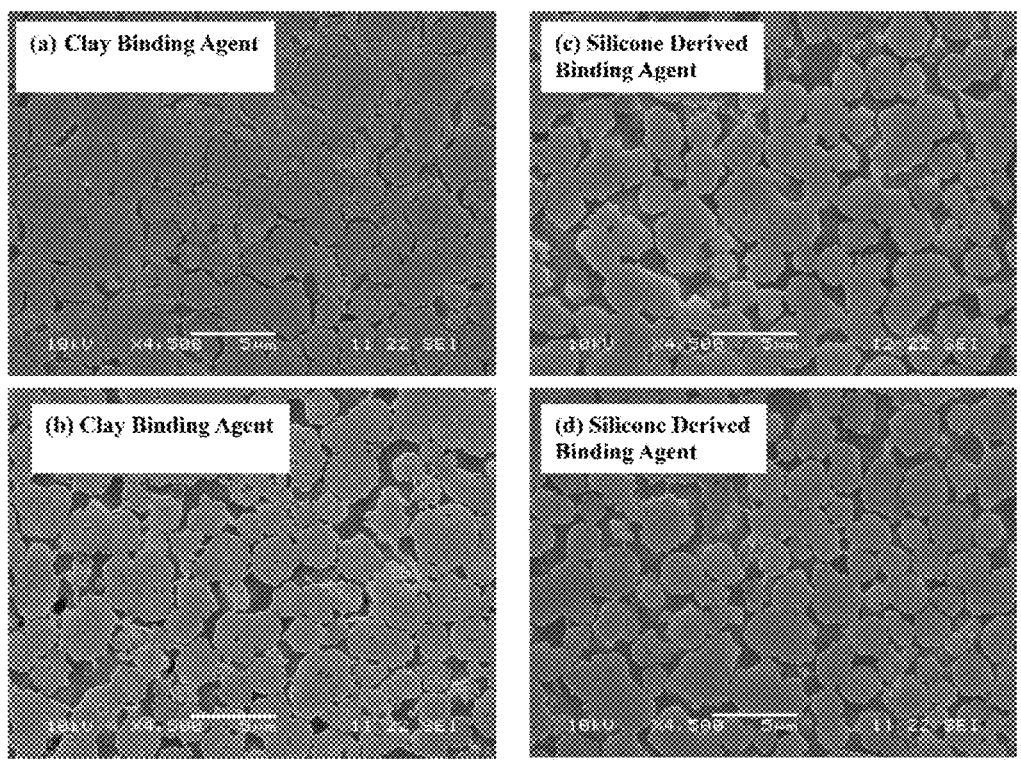
FIG. 1 is a set of 4 Scanning Electron Microscope images each showing a cross section of an adsorbent bead made using a conventional binding agent (a) and (b) and the silicone derived binding agent of the present invention (c) and (d).

The present invention is directed to adsorbent compositions which are shaped into free-flowing agglomerated particles or beads useful in gas adsorption and separation processes. They are particularly useful for the separation of nitrogen gas or nitrogen gas species from air and other gas mixtures. Preferred are processes requiring adsorbents having high $N_2$ adsorption capacities, high adsorption rates, high crush strength values and attrition resistance, and which require the ability to withstand the demands of packed bed adsorption processes including pressurization/depressurization stresses.

Although useful in other processes, the adsorbent compositions are preferably used in cyclic adsorption processes for the adsorption of nitrogen gases from air in PSA, TSA, VSA, or VPSA type processes or a combination thereof for the production of oxygen from air. PSA, TSA, VSA or VPSA processes or systems separate gas species from a mixture of gases under elevated pressure and/or temperatures according to the gas species' molecular characteristics and affinity for the adsorbent. The feed air is passed through a first porous packed bed containing the adsorbent material which adsorbs the target gas species (nitrogen) at higher pressures and then the process reverses to a lower pressure and process gas is used to purge and desorb the adsorbed gas species (nitrogen) from the adsorbent material in the bed. Typically, this process alternates between two or more beds maintaining a continuous operation although single bed systems are known. The steps in a multi-bed air separation adsorption cycle generally include: (1) adsorption (feed) at high pressure, (2) countercurrent blowdown to lower pressure or vacuum, (3) countercurrent purge with a gas relatively free of impurities, and (4) repressurization to higher pressure with either feed air or purified air. The regeneration of the adsorbents in the process is achieved by a combination of a simple reduction in pressure, including vacuum, and/or elevation of temperature and subsequent purge with an impurity-free gas. Any reactor or vessel configuration can be employed such as those having a radial or axial configuration.

The adsorbent compositions of this invention must be capable of withstanding the rigorous conditions of cyclic adsorption and are derived from mixtures of at least one active material and a silicone binder precursor which, after subsequent heat treatment, transforms into the binding agent. The active materials useful for nitrogen adsorption include one or more natural and synthetic aluminosilicates and/or molecular sieves. Preferred are zeolites which are thermally stable (i.e. retain appreciable surface area as measured for instance by the established BET method see Chapter 3 in Analytical Methods in Fine Particle Technology, Paul A. Webb & Clyde Orr, Published by Micromeritics Instruments Corp., 1997 ISBN0-9656783-0-X) at the temperatures required to volatize the organic matter associated with the silicone binder precursor. Such materials are subject to rigorous process conditions and must have internal support structures that can withstand such conditions over extended periods. Preferred are one or more type X zeolites which may incorporate cations, such as Li, Ca, K, Na, Ag and mixtures thereof, exchanged into the lattice structure and having a $SiO_2/Al_2O_3$ ratio of less than 15, more preferred less than 5, and most preferred less than or equal to 2.5. Examples of such zeolites include X2.0 or LSX. Most preferred is LiLSX having a Li content of ≥95%. The preferred X zeolites as described above are particularly selective for $N_2$ adsorption and generally have weaker infrastructures than those zeolites having high $SiO_2/Al_2O_3$ ratios, such as those having $SiO_2/Al_2O_3$ ratios of more than 20 which are commonly used as catalyst materials or catalyst support structures. Accordingly, these active materials must be prepared using techniques that strengthen, or at least do not weaken, the infrastructure. For this reason, strengthening the support structure of the zeolite, and ultimately of the agglomerate particles, is critical and it has been found that the used of binding agents dispersed or carried in organic solvents should be avoided.

The active material has an average particle size of greater than 1 micron and preferably greater than 4 microns to produce the agglomerated particle having the pore characteristics described in this invention. Particles having a average size of 1 micron or smaller cannot be made into agglomerated particles having a median pore diameter of equal to or greater than 0.45 µm and having a 10% or less of the macropores and mesopores of less than or equal to 0.1 micron. It is also preferred that the final agglomerated adsorption composition (active material and binding agent) have a mean particle size ranging from 0.4 mm to 5.0 mm and more preferably from 0.6 to 1.8 mm. X zeolites are particularly suitable as the active component since the manufacturing process can employ thermal treatments at temperatures of 400° C. up to about 700° C. without degradation while permitting the conversion of the silicones to the form which acts as the binding agent. In general, adsorbents that have been agglomerated using traditional clay binders or other molecular silica binders, including colloidal silica binders, can be agglomerated using the silicones of the subject invention.

As described, silicones are used as the binder precursors which, during the course of adsorbent preparation, transform to a form or species which becomes the binding agent in the final agglomerated particles. Silicones are synthetic compounds comprised of polymerized or oligomerized units of silicon together with predominately carbon, hydrogen and oxygen atoms. Silicones, also commonly known as siloxanes or polysiloxanes, are considered a hybrid of both organic and inorganic compounds since they contain organic side chains on an inorganic —Si—O—Si—O— backbone. Their structures can include linear, branched, cross-linked and cage-like variants.

Silicones have the general formula $[R_2SiO]_n$, where R is one or more organic side groups selected from C1 to C8 organic compounds, preferably C1 to C4 organic compounds, including linear, branched and cyclic compounds or mixtures thereof and wherein the polymeric or oligomeric silicones are typically terminated by hydroxy, methoxy, ethoxy groups or mixtures thereof. The silicones of interest generally have molecular weighs ranging from about 100 to more than 500. The R side group can also represent other organic groups such as vinyl or trifluoropropyl and a wide range of silicones are believed to be useful in this invention. Examples of silicones include, but are not limited to, polydimethylsiloxanes and polydiphenylsiloxanes such as those indentified by Chemical Abstracts Service (CAS) Registry Numbers 63148-62-9 and 63148-59-4 and those with di-methyl groups in polymeric forms with methyl, octyl silsesquioxanes such as CAS Registry Number of 897393-56-5 (available from Dow Corning under the designation IE 2404); methyl silsesquioxanes such as CAS Registry Number of 68554-66-5; and (2,4,4-trimethylpentyl) triethoxysilane such as CAS Registry Number 35435-21-3. Preferred silicones are selected from hydroxy, methoxy, or ethoxy terminated polymeric di-methylsiloxane or mixtures thereof with methyl-silsesquioxanes, octyl-silsesquioxanes, methyl octyl-silsesquioxanes, or mixtures thereof.

Silicones of more than one type can be used and the silicones can be used with other organic or inorganic compounds. Common additional components include water, co-polymer stabilizing agents, emulsifying agents and surfactants and silicone emulsions and suspensions can be employed as the silicone binder precursors. These additional components are often present to stabilize the particular form of the silicone which is typically used in the form of an emulsion, solution, or resin.

In one embodiment, the silicone binder is used together with a clay binding agent to form a dual binding agent system, wherein the clay binder is present in a concentration of not more than 1 part clay binder to 5 parts silicone-derived binding agent and preferably not more than 1 part clay to 10 parts silicone-derived agent, when measured on a dry weight final product basis. The total amount of clay binder should not exceed 3%, preferably 2%, on a dry weight final product basis of the agglomerated adsorption composition. The use of small quantities of clay as a binder is particularly advantageous for bead forming processes to increase the manufacturing yield and/or increase the manufacturing throughput. In these cases, it is preferred that the clay be used initially to form seeds or nuclei of the adsorbent composition to stimulate the agglomeration process and thereafter the silicone-derived binding agent is used to complete the agglomeration process. Typically, the seeds or nuclei are formed of clay and the active adsorbent material and comprise from about 0.5-25% of the volume of the agglomerated particle and wherein the percentage of the overall binding agent that is clay is not more than 18% by weight, with the balance being silicone-derived binding agent.

The typical manufacturing process to make adsorbents requires a heat treatment step generally known as calcination. Calcination is a thermal treatment intended to bring about one or more of; thermal decomposition, phase transition, or removal of volatile fractions (partial or complete) depending on the final material and its intended use. The calcination process is normally conducted in presence of air and takes place at temperatures below the melting point of the active component(s). The adsorbent compositions of this invention are prepared with a suitable thermal treatment process that is effective to remove substantially all of the volatile matter associated with the silicone-derived binding agents and any temporary organic binders used as processing aids.

During the heating process, the silicone binder precursor transforms into a species which becomes the binding agent for the adsorbent particles forming the agglomerate and does not interfere with the desired pore architecture. As used herein, "silicone-derived binding agent" is intended to describe the silicone species that has undergone sufficient thermal or heat treatment to have volatilized substantially all of the organic side groups associated with the starting silicone binder precursor and leaving a silicon-containing binder residue. It is believed that the silicones are transformed by the heat treatment into a new silicon containing species having a modified chemical composition which is extremely effective as binding agents for adsorbent particles, especially zeolite containing compositions, and provide sufficient strength to the agglomerates at concentrations of 10% or less, preferably 7% or less, and more preferably 5% or less calculated on a dry weight final product basis. It is believed that substantially all of the organic side groups are lost while the residual inorganic Si and O atom backbone is retained serving as the core of the binding agent for the adsorbent particles. This silicone-derived binding agent is capable of yielding agglomerated particles having crush strengths of equal to or greater than 0.9 lbF as measured on particles of 1.0 mm mean size using the individual bead crush strength method. The use of silicone-derived binding agents have been found to provide the specific pore architecture required to obtain adsorbents with high $N_2$ adsorption rates, $N_2$ pore diffusivities ($D_p$) greater than or equal to $4.0 \times 10^{-6}$ m$^2$/s, and $N_2$ adsorption capacities of equal to or greater than 26 ml/g at 1 atm and 27° C., preferably greater than 26.0 ml/g at 1 atm and 27° C.

For the purposes of this invention, the term mean particle size is that which is determined from a standard screening analysis, using U.S.A Standard mesh screens with the weight of sample retained on each screen determined and corrected back to a dry weight basis using an Loss on Ignition (LOI) measurement or other suitable means. The term "mesh" is understood to be U.S.A. Standard mesh. For crush strength measurements, a 1.0 mm mean particle size sample can be prepared by combining equal weight fractions (dry weight basis) of particles having size 16×18 mesh and 18×20 mesh. In this designation of 16×18 mesh or 18×20 mesh, it is understood that the particles pass through the first screen and are retained on the second screen (i.e. for 16×18 mesh the particles pass through the 16 mesh screen and are retained on the 18 mesh screen). All crush strength measurements are either measured herein on particles of 1.0 mm mean size prepared using the screening method described above, or if measured at particle sizes other than 1.0 mm mean size, are compared against the value obtained, at equivalent mean particle size, as calculated by the formula y=1.2x−0.3 (where y=the crush strength in lbF and x is the mean particle size in mm) which has been derived to account for the dependence of crush strength on mean particle size (see below). Preferred adsorbents of the present invention will have crush strengths above the limiting value, for any given particle size, as calculated from the formula above. Adsorbents having these silicone-derived binding agents also show exceptional attrition resistance at these low binder concentrations (post calcination) which reduce both loss of active material and equipment malfunction/cleaning.

Agglomerated adsorbent particles made with the silicone-derived binders result in pore structure characteristics that differ from those found in adsorbents made with standard colloidal silicas and conventional clay binders and such conventional binders are commercially used in concentrations of above 10 percent by weight to provide acceptable crush strengths for gas separation processes. For example, adsorbents made using colloidal silica binding agents continue to exhibit a measurable amount of undesirable small pores (i.e. pores less than 0.1 μm) which are generally absent in the adsorbents made with the silicone-derived binding agents. In addition, the crush strength and attrition resistance of adsorbents prepared with the silicone-derived binding agents are significantly improved compared to similarly produced agglomerated adsorbent particles made with other binders at similar concentrations and the adsorption capacity is very high and comparable with adsorbents made binderless using the more complex caustic digestion methods of manufacture. Finally, as a result of the refined pore structure obtained from the use of silicone-derived binding agents in aqueous solvent, the adsorption kinetics are surprisingly enhanced versus traditional adsorbents bound with clay binders in concentrations above 3% by weight or made with other solvents.

One method of preparing the adsorbents of the present invention is as follows. A granulation seed is prepared by combining an active adsorbent material with a clay material, such as attapulgite, sepiolite, halloysite, purified versions thereof and their mixtures in the approximate ratio (dry basis) of 80-90 parts active component to 10-20 parts clay. The clay/zeolite seed forms the core of the agglomerated particle with the seed particle comprising from 0.1-25% (by volume) of the agglomerated particle. Agglomerated seed particles made of silicone alone utilized to initiate the agglomeration step as the zeolite/silicone binder mixture are not as effective in producing the controlled particle growth that is required for commercial manufacturing processes, resulting in a low yield and time consuming, inefficient and financially unattractive production processes. This process follows conventional preparation steps but includes mixing the seed material comprising the active materials and clay binder with the mixture of active material and silicone binding agent. The mixture of seed material and active with silicon derived binding agent is dried, calcined, and optionally rehydrated, treated with a metal salt to effect ion exchange, dried again and activated as is understood by the skilled person.

In another embodiment, a mixture is prepared comprising an active component and a silicone binder and a processing aid. In some cases, in order to obtain a particle with temporary particle strength (green strength), a plasticizing agent, such as, but not limited to methyl cellulose, can be employed. Temporary particle strength is critical in commercial manufacturing to provide the particle with enough green strength to be conveyed to one unit operation after another without excessive loss of the agglomerated particles. However, plasticizers, such as methyl cellulose, pore formers and/or temporary binders have been found to adversely affect the final pore structure for some applications, resulting in pore architectures outside the preferred ranges. Moreover, the use of plasticizers, has been found in some cases to reduce the manufacturing yield by virtue of its binding very strongly at temperatures less than or equal to 300° C., leading to plugging of beading forming and calcination equipment. In demonstrative production trials, product yields were decreased by as much as 40% relative to formulations that did not utilize methyl cellulose. This was especially true in comparing example 4 (no methocel) and example 5 (with methocel). The presence of methylcellulose has also been found to produce beads with low sphericities and/or shape factors which are undesirable from the standpoint of increasing the pressure-drop in packed bed adsorption processes, compared to beads of equivalent size having high sphericities and shape factors near unity. Such temporary binders are typically not employed in commercially manufacturing processes and the preferred adsorbents of this invention are prepared in the absence of methyl cellulose and other process aids.

The blending of the adsorbent components must be thorough, such that the final product is consistent in terms of appearance and other properties, such as loss on ignition and viscosity. High intensity or high shear mixing equipment is particularly preferred from the standpoint of obtaining a mixed product with a high level of consistency and homogeneity and to densify the mixture. However, other mixing equipment which is capable of combining the components of the agglomerate formulation together, such that they are passable to the subsequent stages of manufacturing and ultimately result in products having the required physical and performance characteristics, can be used.

The binder concentration of the adsorbent material is determined by the standard McBain test (see e.g., Bolton, A. P., "Molecular Sieve Zeolites," in *Experimental Methods in Catalytic Research*, Vol. II, ed. R. B. Anderson and P. T. Dawson, Academic Press, New York, 1976) using $O_2$ adsorption, on activated adsorbent samples, at 77K and 70 Torr by reference to a powder analogue of, the active component by itself, (i.e. in a non-agglomerated "binderfree" form). The output from the McBain test is the fractional amount of active component from which the binder content is defined as the difference in wt % $O_2$ adsorbed between the reference powder analogue and the final product relative to the reference powder analogue (i.e. (wt % $O_2$ adsorbed (powder analogue)–wt % $O_2$ (final product))/wt % $O_2$ (powder analogue) represents the fractional binder content. Multiplying this fractional binder content by 100 results in the wt % binder.

For purposes of the present invention, the procedure for carrying out the McBain test is as follows: The sample is air dried prior to the McBain test. It is then placed in the McBain apparatus and slowly dehydrated and activated under evacuation overnight, i.e. at a pressure of about $1 \times 10^{-4}$ torr. The temperature is ramped from ambient to about 400° C. in eight hours and then held at this temperature for an additional eight hours. The sample is then cooled to liquid $N_2$ temperature (77K) and ultra high purity $O_2$ is introduced and maintained at a pressure of 70 torr until equilibrium is reached. The amount of $O_2$ adsorbed (wt %) is determined gravimetrically through an accurate measurement of the change in length of a calibrated helical spring. The measurement is repeated in the same way for the powder analogue reference sample and the binder content in wt % is calculated as described above.

For clarification, the binder content of prior clay-bound adsorbents, which are used herein for comparative purposes, is commonly reported as the fractional amount of clay contained within the mixture of adsorbent powder and clay binder on a dry weight basis. However, depending on whether or not compositional changing manufacturing steps (i.e. ion exchange) are used post agglomeration, the reported dry weight binder content may or may not be on a dry weight final product basis. This usual practice is retained for the purpose of the comparisons made with the invention. As a result of potential compositional changes after the agglomeration step, the reported binder content for clay binder containing samples may be different to that measured by the McBain standard method described above.

After the components have been blended together, they are ready for agglomeration into particles, which are preferred for packed bed type applications like the processes described herein. Examples of suitable adsorbent shapes include beads, pellets, tablets, extrudates and granules. Shaped bodies such as the honeycomb structures typically used in various catalytic processes and as taught in U.S. Pat. No. 7,582,583 are not well suited for use in bulk cyclic gas separation processes dues to their low cell densities which translate to a low fraction of active material per a given fixed volume of adsorbent bed and are avoided. Additionally, the loading of the honeycomb structures comprising very hydrophilic active materials into an adsorbent bed for use in PSA, VSA or VPSA systems is difficult and there is no high temperature process to recondition the adsorbent if it becomes wet during the loading operation, unlike most catalytic processes which are operated at elevated temperatures.

These and other problems are avoided if the adsorbent components are shaped into a free-flowing form (i.e. bead or extrudate) as required for such adsorption/separation processes and an appropriate piece of equipment is used as is known. For the beaded type products which are required for most packed bed adsorption processes, accretion wheels, mixers, and rotating pans are all acceptable devices for agglomeration. The purpose of the agglomeration step is to make agglomerates having sizes which meet the needs of the application (typically from about 0.4 to 5 mm for most adsorption processes) and possessing sufficient strength, often called green strength, to survive any required additional processing steps, such as screening, as well as transportation to the next manufacturing operation. The agglomeration method and equipment can be any that accomplish the objective of obtaining agglomerate products with physical and performance characteristics which satisfy the criteria disclosed herein.

After agglomerates of the target particle size have been obtained from the agglomeration step, it is necessary to conduct the thermal treatment/calcination as described above to remove any removable components including volatile organic components, especially hydrocarbon groups, from the silicone binder precursor and convert the silicone binder precursor to the form that binds and adds strength to the agglomerated particles. Calcination is typically conducted at temperatures from above 300° C. to about 700° C. Preferably, the thermal treatment is accomplished by staging the temperature rise from near ambient to greater than 400° C. in the presence of a suitable purge gas, such as dry air. The type of purge gas is not considered limiting and any purge gas which completes the objectives of the thermal treatment can be used. The thermal process removes any removable species, conditions the adsorbent for use (e.g. lowers the residual moisture content to values of $\leq 1$ wt % as measured by a suitable technique such as the Karl Fischer titration method (see U.S. Pat. No. 6,171,370)) in the final process and systems, and strengthens the agglomerated particles to meet the crush strength specification. Any oven type, furnace type or kiln type can be used.

This basic manufacturing method for the adsorbents can be augmented by additional steps or stages as dictated by the adsorbent type and intended application. Examples of common additional processing steps include, but are not limited to, ion exchange processes for zeolites and aging steps for aluminas and silicas.

The products obtained from the above manufacturing process are agglomerated adsorbent particles having particle diameters in the 0.4 to 5.0 mm size range. The resulting free-flowing agglomerated particles have high adsorption capacities and fast adsorption rates which surpass prior adsorbents. Adsorbent compositions made from these particles will exhibit a $N_2/O_2$ Henry's Law selectivity of greater than 15.8, more preferably greater than 15.9. Low silicone-derived binding agent concentrations of 10 wt % or less, preferably 7 wt %, and more preferably 5 wt % or less can be used with the final adsorbent particles while still exhibiting the superior crush strength and attrition resistance requirements. A final silicone-derived binding agent content of 10 wt % or less, 7 wt % or less, and 5 wt % or less results in an active component fraction of at least 90 wt % or more, preferably 93 wt % or more and most preferably 95 wt % or more in the agglomerated adsorbent. The more active component fraction in the adsorbent, with the correct adsorption characteristics and acceptable crush strength, will result in a higher rate material. Traditional clay bound products using similar manufacturing processes generally require binder concentrations of over 10 wt % and, more commonly at least 15 wt %, to achieve sufficient crush strength and attrition resistance resulting in lower concentrations of active component in the final composition.

FIG. 1$a$-$d$ is a set of 4 Scanning Electron Microscope images each showing a cross section of an LiLSX adsorbent bead made using either a clay binding agent (a) and (b) or a silicone derived binding agent of the present invention (c) and (d) at 4500× magnification. The SEM images are "true" cross-sections of the agglomerated particles and pores greater than about 0.05 µm can be seen at this magnification. The consistent "binder-free" nature of the macropores is apparent for the silicone-derived binder sample.

In FIG. 1($a$), the clay binder is clearly visible as a fibrous particulate, lying in between the crystallites of the adsorbent and can be clearly seen to result in a region of low porosity as a result of the clay binding agent filling the pores that result from the stacking of the adsorbent crystallites. In FIG. 1($b$) a different area of the bead is represented still showing some binding agent filling in the pores, resulting from the stacking of the adsorbent crystallites, albeit to a lesser extent. Without wishing to be bound by theory, it is believed that these "dense" clay binder rich and "porous" clay depleted regions coexist within a single agglomerated adsorbent particle, serve to create less desirable pore structures, and as a result, slower adsorption kinetics.

In the case of adsorbent bound with silicone-derived binding agents as shown in FIGS. 1($c$) and 1($d$), the location of the binding agent is not clearly identifiable suggesting that the new silicone-derived species formed during the heat treatment which is binding the particles are of small particle size. Again not intending to be bound to theory, it is believed that the silicone-derived species forms clusters or (partial-porous) coatings on the adsorbent crystallite surfaces forming contact points for the binding of one crystallite to another. Since the pores of the inventive adsorbent are overwhelmingly free of binding agent, pore structure improvements are seen as expressed in the median pore diameter, percent of small pores and pore connectivity characteristics.

Three parameters are used to provide a more detailed view of the adsorbent pore structure of the inventive adsorbents; namely the median pore diameter, the fraction of pores that are ≤0.1 μm and a hysteresis parameter representing pore connectivity. These parameters are all measured and obtained from the standard Hg porosimetry techniques. The median pore diameter is known to support pore structures having improved characteristics (e.g. see, U.S. Pat. No. 6,425,940 B1). The second parameter is the fraction of small pores, denoted F (see Equation 2), and is a measure of the amount of rate or mass transfer limiting small macropores and mesopores present in the agglomerated adsorbent particles, which are determinable by the Hg porosimetry technique. With reference to Equation 2, I (60,000 psia) is the cumulative intrusion volume at 60,000 psia, I (2 psia), is the cumulative intrusion volume at 2 psia and I (1,900 psia) is the cumulative intrusion volume at 1,900 psia. As defined herein, F is a measure of the fraction of pores of pores of size ≤0.1 μm and has also been used in the prior art to indicate the novelty of an agglomerate pore structure (e.g. see, U.S. Patent application 2011104494 and U.S. Pat. No. 6,171,370 B1 where the detrimental impact of large fractions of these small macropore and mesopore transport pores are taught). The third parameter is the hysteresis factor "R" which has been defined from standard Hg porosimetry data as shown in Equation 1 wherein: I (60,000 psia) is the cumulative intrusion volume at 60,000 psia from the intrusion curve, I (50 psia) is the cumulative intrusion volume at 50 psia from the intrusion curve and E (50 psia) is the cumulative intrusion volume at 50 psia from the extrusion curve.

$$R = \frac{V_E}{V_I} = \frac{I(60,000\ psia) - E(50\ psia)}{I(60,000\ psia) - I(50\ psia)} \quad (1)$$

$$F = \left(1 - \frac{I(1,900\ psia) - I(2\ psia)}{I(60,000\ psia) - I(2\ psia)}\right) \times 100 \quad (2)$$

The pore structure characteristics of the present agglomerated adsorbents are as follows: the median pore diameter of equal to or greater than 0.45 μm, 10% or less of the macropores/mesopores are less than or equal to 0.1 μm, and the hysteresis factor is equal to or greater than 0.6. The use of intrusion and extrusion data from Hg porosimetry to determine pore structure and connectivity information, such as the presence or absence of ink-bottle pores, is well known and described in text books on this subject (see Chapter 4 in Analytical Methods in Fine Particle Technology, Paul A. Webb & Clyde Orr, Published by Micromeritics Instruments Corp., 1997 ISBN0-9656783-0-X). From the perspective of a preferred pore structure and connectivity, the larger the value of the hysteresis factor R for an agglomerate towards a maximum of 1, the better since, this equates to a more homogeneous pore architecture without ink-bottle and other less desirable pores morphologies. From the standpoint of defining the pore structure of the agglomerated adsorbents disclosed herein, a high value for the median pore diameter, a low fraction (F) of pores less than or equal to 0.1 μm and a high hysteresis factor (R) are preferred. In terms of measurement of the adsorption capacity, volumetric and gravimetric adsorption systems can be used. The adsorption capacities reported herein have been determined at a pressure of 1 atm and a temperature of 27° C. The adsorbents of the present invention offer adsorption capacities which are superior to compositions prepared using only clay binding agents, after accounting for the binder content of the product. This surprising result is believed to be due to the use of the silicone-derived binding agent and the minimization of the amount of clay present in the free-flowing agglomerated particles.

Finally, the preferred free-flowing agglomerated adsorbent particles of the present invention will have crush strength values, as measured by the single bead method, of equal to or greater than 0.9 lbF at 1.0 mm mean particle size and an attrition rate below 1%, preferably 0.75%. A simple equation is established to account for the dependence of the crush strength value on the mean particle size of the bead or agglomerated particle. According to this equation, the agglomerated particles will have a crush strength value greater than that obtained from the value determined by the relationship of $y = 1.2x - 0.3$ where y is the mean crush strength in lbF and x is the mean particle size in mm. Percent attrition is determine as the amount of product passing a U.S.A. Standard 25 mesh screen after 60 minutes of agitation using 100 g of calcined material prescreened to greater than 25 mesh in a Ro-tap® Sieve Shaker model RX-29 equipped with 8" diameter screens.

In Table 1, characteristics for representative LiLSX zeolite adsorbents made using traditional clay binders and the silicone-derived binding agents of the present invention are shown. A representative binderless adsorbent is also provided for comparison prepared by the caustic digestion method as taught in U.S. Pat. No. 6,425,940 B1. The pore diffusivity ($D_p$) as determined using the method and equipment described in U.S. Pat. No. 6,500,234 B1 and U.S. Pat. No. 6,790,260 B2 is also given in Table 1.

TABLE 1

Pore Structure Parameters from Hg Porosimetry and Nitrogen Pore Diffusivity ($D_p$) for LiLSX Adsorbents made with Clay and Silicone-Derived Binding Agents

| Sample | Binder Type | Binder Content (wt %) | Porosity (%) | Median Pore Dia. (μm) | % of Pores ≤ 0.1 μm F | Hysteresis Factor R | $D_p$ (m²/s) |
|---|---|---|---|---|---|---|---|
| I. | Silicone - derived | 5 | 38 | 0.52 | 7.1 | 0.8 | $4.9 \times 10^{-6}$ |
| II. | Clay | 7 | 38 | 0.33 | 25.4 | 0.4 | $2.5 \times 10^{-6}$ |
| III. | Binderless | N/A | 36 | 0.90 | 9.1 | 0.2 | $3.9 \times 10^{-6}$ |

I. See Example 2 for preparation details
II. Sample from commercial supplier from Zeochem, LLC
III. Sample prepared as described in U.S. Pat. No. 6,425,940 B1

From the data in Table 1, it is evident that the LiLSX zeolite adsorbent with the silicone-derived binding agent has the best combination of a high median pore diameter, a lower percentage of pores ≤0.1 μm and an improved hysteresis factor compared to the other samples. The median pore diameter for the binderless sample is the highest of the three samples, yet the $N_2$ pore diffusivity is inferior to the silicone-derived sample, indicating an inferior adsorption rate. The hysteresis factor is also lower for the binderless sample indicating a less effective pore architecture. The three parameters from the Hg porosimetry measurement defined in combination represent a more complete view of the actual pore architecture and are good predictors of the adsorption rate, compared to any of the parameters used in isolation. The adsorbents with the silicon-derived binding agents clearly exhibit a superior pore architecture for gas separation processes.

Finally, adsorbents made using the silicone-derived binding agents exhibit high adsorption rates as measured by nitrogen pore diffusivity ($D_p$, a measure of adsorption rate). The agglomerated adsorbent particles of this invention exhibit a $D_p$ of greater than $4.0 \times 10^{-6}$ m$^2$/s. This compares to adsorbents particles bound with conventional clay binders with a $D_p$ of less than $3.0 \times 10^{-6}$ m$^2$/s and the binderless adsorbent particles with a $D_p$ of $3.9 \times 10^{-6}$ m$^2$/s. The following Examples demonstrate the differentiated features of the inventive adsorbents from adsorbents made from conventional binders including clays and colloidal silica bound products. The Examples are provided at 7 wt % silicone-derived binding agent and less. Useful adsorbents can be prepared at higher binder concentrations, including 10 wt % silicone-derived binding agent. Increasing the binder concentration will provide improved physical characteristics especially the crush strength, as is understood by one skilled in the art. At a binder concentration of up to 10 wt %, the improvements to $D_p$, median pore diameter, percentage of pores ≤0.1 μm and hysteresis factor described herein, will be achieved versus the traditional clay and colloidal silica binding agents described in the prior art. At 10 wt % binding agent, the active phase concentration of 90% is still high versus many traditional prior art compositions. At binder concentration of greater than 10 wt %, the benefit of high active phase concentrations, offered by the present invention, diminish.

Example 1

NaKLSX Zeolite Adsorbent with 7 wt % Silicone-Derived Binding Agent 2000.0 g of zeolite NaKLSX powder on a dry weight basis (2684.6 g wet weight) were mixed with 60 g F4M Methocel in a Hobart mixer for 10 minutes. Thereafter with the mixer still agitating, 467.5 g of IE-2404 (a silicone containing silicone resin emulsion from Dow Corning) was pumped in at rate of 15 ml/min. After the IE-2404 addition was completed, mixing was continued for an additional 1 hour, before the now mixed products were transferred to a Nauta mixer having internal volume ~1 ft$^3$ and agitated therein at a speed of 9 rpm. The Nauta mixing was continued, while gradually adding deionized water to form beads having porosity in the range 35-40%, as measured after calcination using a Micromeritics Autopore IV Hg porosimeter. At the end of this mixing time, beads including those in the target 12×16 mesh size range had formed. The product beads were air dried overnight prior to calcination using a shallow tray method at temperatures up to 593° C. The shallow tray calcination method used a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcination. The temperature was set to 90° C. followed by a 360-minute dwell time. The temperature was then increased to 200° C. gradually over the course of a 360-minute period (approximate ramp rate=0.31° C./min), and then further increased to 300° C. over a 120-minute period (approximate ramp rate=0.83° C./min) and finally increased to 593° C. over a 180-minute period (approximate ramp rate=1.63° C./min) and held there for 45 minutes before cooling. The calcined beads were subjected to a screening operation to determine the yield and harvest those particles in the 12×16 mesh size range.

Example A (Comparative)

NaKLSX Zeolite Adsorbent with 7 wt % Colloidal Silica Binding Agent 2000.0 g of zeolite NaKLSX powder on a dry weight basis (2684.6 g wet weight) were mixed with 60 g F4M Methocel in a Hobart mixer for 10 minutes. Thereafter with the mixer still agitating, 376.4 g of Ludox HS-40 colloidal silica (from Dow Chemical) was pumped in at a rate of 17 ml/min. After the colloidal silica addition was completed, mixing was continued for an additional 1 hour, before the now mixed products were transferred to a Nauta mixer having internal volume ~1 ft$^3$ and agitated therein at a speed of 9 rpm. The Nauta mixing was continued, while gradually adding deionized water to form beads having porosity in the range 35-40%, as measured after calcination using a Micromeritics Autopore IV Hg porosimeter. At the end of this mixing time, beads including those in the target 12×16 mesh size range had formed. The product beads were air dried overnight prior to calcination using the shallow tray method at temperatures up to 593° C., as described in Example 1. The calcined beads were subjected to a screening operation to determine the yield and harvest those particles in the 12×16 mesh size range.

Example B (Comparative)

NaKLSX Zeolite Adsorbent with 7 wt % Clay Binding Agent 2000.0 g of zeolite NaKLSX powder on a dry weight basis (2684.6 g wet weight) were mixed with 150.5 g Actigel 208 on a dry weight basis (195.5 g wet weight) and 60.0 g F4M Methocel in a Hobart mixer for 1 hour and 35 minutes. The product from the Hobart was transferred to a Nauta mixer having internal volume ~1 ft$^3$ and agitated therein at a speed of 9 rpm. The Nauta mixing was continued, while gradually adding deionized water to form beads having porosity in the range 35-40%, as measured after calcination using a Micromeritics Autopore IV Hg porosimeter. At the end of this mixing time, beads including those in the target 12×16 mesh size range had formed. The product beads were air dried overnight prior to calcination using the shallow tray method at temperatures up to 593° C., as described in Example 1. The calcined beads were subjected to a screening operation to determine the yield and harvest those particles in the 12×16 mesh size range.

TABLE 2

Pore Structure Parameters for Examples 1, A and B

| Sample | Binder Type | [1]Mean Particle Size (mm) | [2]Porosity (%) | [2]MPD (μm) | [2]% Pores ≤ 0.1 μm F | [2]Hysteresis Factor R (Dim.) | [3]Crush Strength (lbF) | [4]Attrition (wt %) |
|---|---|---|---|---|---|---|---|---|
| 1 | Silicone-derived | 1.75 | 35.2 | 0.88 | 7.1 | 0.8 | 3.4 | 0.3 |
| A | Coll. Silica | 1.75 | 32.4 | 0.61 | 14.0 | 0.8 | 0.6 | 1.6 |
| B | Clay | 1.73 | 39.6 | 0.56 | 16.2 | 0.4 | 0.8 | 1.1 |

[1]Mean particle size is determined using a standard screening analysis method using 100 g of calcined material in a Ro-tap ® Sieve Shaker model RX-29 equipped with 8" diameter U.S.A. Standard mesh screens using 15 minutes of agitation.
[2]Porosity, median pore diameter (MPD), % pores ≤ 0.1 μm and hysteresis factor are determined as described above from Hg porosimetry data.
[3]Crush strength is measured on calcined products by the single bead method, using 40 beads from which the mean crush strength is calculated. All crush strength measurements employed a Dr. Schleuniger Pharmatron Tablet Tester 8M equipped with a 50N load cell.
[4]Percent attrition is determine as the amount of product passing a U.S.A. Standard 25 mesh screen after 60 minutes of agitation using 100 g calcined material prescreened to greater than 25 mesh in a Ro-tap ® Sieve Shaker model RX-29 equipped with 8" diameter screens.

Figure 2:
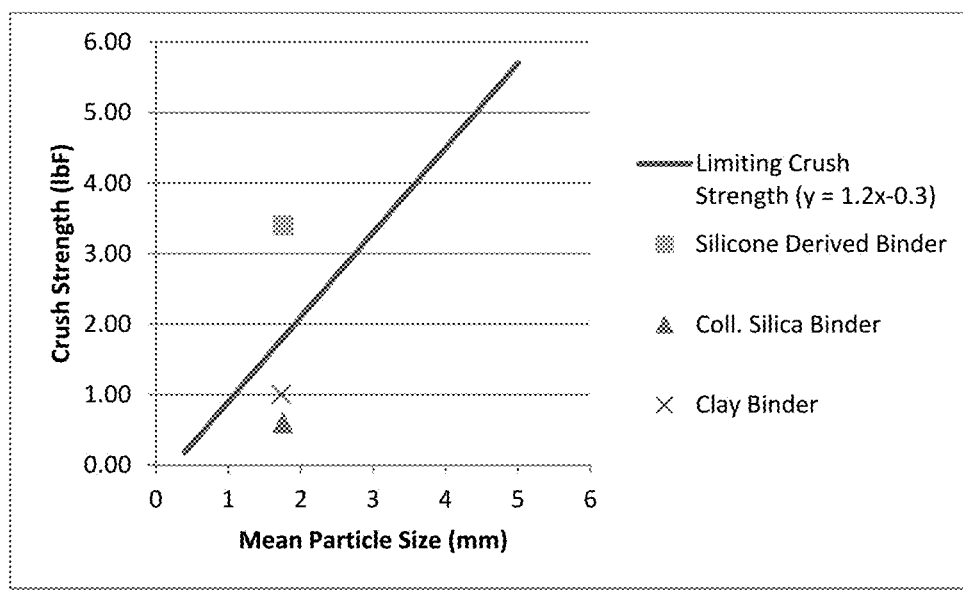
FIG. 2 is a graph showing the limiting crush strength versus mean particle size for compositions using conventional binding agents compared to the silicone derived binding agent of the present invention.
Figure 3:
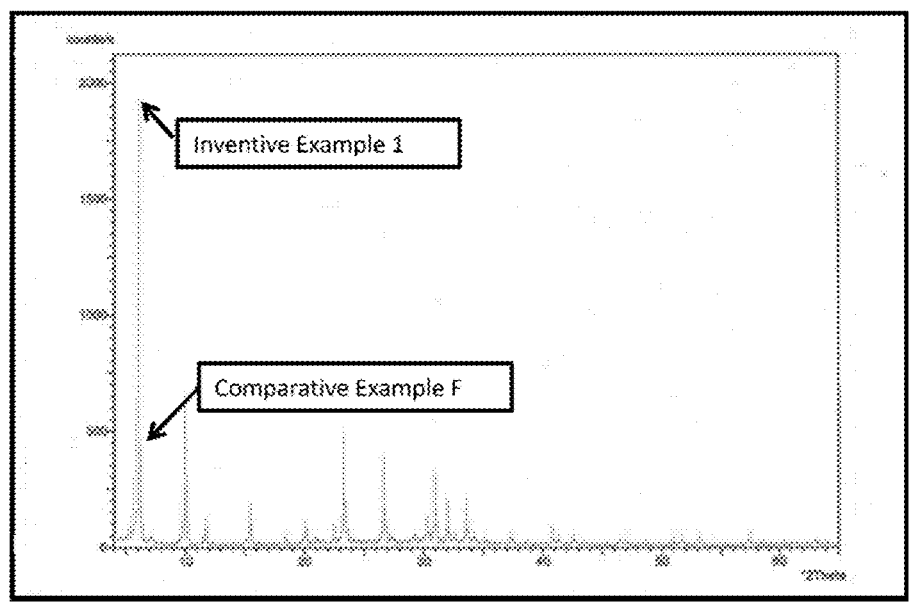
FIG. 3 is X-ray diffraction data for a comparative adsorbent composition using silicon derived binding agents in a dibasic ester solvent.

A side by side comparison of characteristics of the adsorbents of Example 1, an adsorbent with a silicone derived binding agent, Comparative Example A, a colloidal silica binding agent, and Comparative Example B, a traditional clay binder, is shown in Table 2. The three adsorbents had an equivalent particle size and binder content. The adsorbent with the silicone-derived binding agent yielded a 400% improvement in the crush strength compared to the other samples. The crush strength results for Example 1 and Comparative Examples A and B are plotted together in FIG. 2 and shown to exceed the limiting crush strength requirement.

Similarly, the attrition resistance, a measure of the amount of dust formed by agglomerate-agglomerate particle contact, was also significantly improved with the silicone-derived binding agent being over 300% better than the closest comparative example, the adsorbent with the clay binder. With respect to the pore structure differences, the samples using colloidal silica binding agents and clay binding agents are characterized by a larger fraction of pores (about 200% more) having a diameter of less than or equal to 0.1 μm suggesting inferior adsorption kinetics. The pore structure information derived from the Hg porosimetry measurements confirms that the pore architecture of the macropores and mesopores of the silicone-derived adsorbent (Example 1) is clearly differentiated from the colloidal silica and clay comparative samples (A and B). The adsorbent of this invention has a median pore diameter of equal to or greater than 0.45 μm; less than 10%, preferably less than 8%, of its pores being less than or equal to 0.1 μm; and a hysteresis factor R of equal to or greater than 0.5.

Example 2

LiLSX Zeolite Adsorbent with 5 wt %
Silicone-Derived Binding Agent, Laboratory
Preparation with Methocel F4M 59.90 lbs. of zeolite NaKLSX powder on a dry weight basis (76.45 lbs. wet weight) were mixed with 0.60 lbs. F4M Methocel in a Littleford LS-150 plow mixer for 1 minute. Thereafter with the mixer still agitating, 9.8 lbs of IE-2404 (a silicone containing silicone resin emulsion from Dow Corning) was pumped in at rate of 1 lb/min. After the IE-2404 addition was completed, 11.0 lbs of water was added at a rate of 1 lb/min under constant stirring in the plow mixer. At the end of the water addition, plow mixing was continued for an additional 5 minutes. The plow mixed powder product labeled hereinafter "the formulation" was transferred to a tilted rotating drum mixer having internal working volume of ~75 L and agitated therein at a speed of 24 rpm. Mixing of the formulation was continued while adding deionized water gradually to form beads. A recycling operation was performed, involving grinding-up and reforming the beads until beads having a porosity, measured using a Micromeritics Autopore IV Hg porosimeter on the calcined product, in the range 35-40% had formed. The product beads were air dried overnight prior to calcination using the shallow tray method at temperatures up to 593° C., described in Example 1.

The calcined beads were subjected to a screening operation to determine the yield and harvest those particles in the 16×20 mesh size range for further processing known in the art including steps of hydration, Li ion exchange and activation up to 593° C. under dry air purge. Li exchange of the samples (to an Li exchange level of at least 96% Li on an equivalents basis) was achieved using the following procedure: A column ion exchange process was used where the samples are packed inside a glass column (dimensions: 3-inch i.d.) contacted with lithium chloride solution (1.0 M) at 90° C. at a flow rate of 15 ml/min. A preheating zone before the adsorbent packed column, ensures the solution temperature has reached the target value prior to contacting the zeolite samples. A 12-fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 50 L, a flow rate of 80 ml/min and a temperature of 90° C. was used. An $AgNO_3$ test, familiar to those skilled in the art, was used to verify that the effluent was essentially chloride free, at the end of the washing stage. The wet samples were dried and activated under dry Air purge (flow rate 200 SCFH) using the same procedure as the shallow tray calcination method described in Example 1 in a General Signal Company Blue M electric oven.

Example 3

LiLSX Zeolite Adsorbent with 5 wt % Silicone-Derived Binding Agent, Laboratory Preparation without Methocel The sample was prepared following the procedure in Example 2 with the exception that no Methocel F4M was added to "the formulation".

Example 4

Na, KLSX Zeolite Adsorbent with 5 wt % Silicone-Derived Binding Agent without Methocel, Semi Commercial Preparation 705 lbs. of zeolite NaKLSX powder on a dry weight basis (881.6 lbs. wet weight) were mixed without any F4M Methocel in a Littleford FKM-2000-D Ploughshare® mixer for 4 minutes. Thereafter with the mixer still agitating, 112.4 lbs. IE-2404 (a silicone containing silicone resin emulsion from Dow Corning) was pumped in at a rate of 4.9 lbs./min. The mixed powder product labeled hereinafter "the formulation" was transferred to a rotating pan granulation wheel. To start the granulation process a small fraction of clay-zeolite seed material was used to promote bead formation. The clay-zeolite seed amount used represented approximately 25% (by volume) of the total charge to the granulation wheel and the clay/zeolite NaKLSX content in seed was 12% clay, balance zeolite. The formulation was added to the clay-zeolite seeds under constant rotation of the pan granulation wheel. During this time water was added through a spray nozzle to promote particle agglomeration. The formulation addition and water addition was continued under constant rotation of the pan granulation wheel until beads including those in the target 10×20 mesh size range had formed. A representative sample of the product beads were air dried overnight prior to calcination using the shallow tray method at temperatures up to 593° C., as described in Example 1. The calcined beads were subjected to a screening operation to determine the yield and harvest those particles in the 10×20 mesh size.

Example C (Comparative)

LiLSX Zeolite Adsorbent with 7 wt % Clay Binding Agent without Methocel, Semi Commercial Preparation 2800 lbs. of zeolite NaKLSX powder on a dry weight basis (3500 lbs wet weight) were mixed with 211 lbs. Actigel 208 clay on a dry weight basis (264 lbs. wet weight) and Nauta mixer. The Nauta mixed powder product labeled hereinafter "the formulation" was transferred to a rotating pan granulation wheel. To start the granulation process a small fraction of clay-zeolite seed material was used to promote bead formation. The clay-zeolite seed amount used represented approximately 25% (by volume) of the total charge to the granulation wheel and the clay/zeolite NaKLSX content in seed was 12% clay, balance zeolite. The formulation was added to the clay-zeolite seeds under constant rotation of the pan granulation wheel. During this time water was added through a spray nozzle to promote particle agglomeration. The formulation addition and water addition was continued under constant rotation of the pan granulation wheel until beads including those in the target 16×20 mesh size range had formed. A representative sample of the product beads were air dried overnight prior to calcination using the shallow tray method at temperatures up to 593° C., as described in Example 1. The calcined beads were subjected to a screening operation to determine the yield and harvest those particles in the 16×20 mesh size range for further processing to the Li ion exchanged and activated form as described in Example 2.

Example 5

LiLSX Zeolite Adsorbent with 5 wt % Silicone-Derived Binding Agent, Commercial Scale Preparation with Methocel F4M 2240 lbs. of zeolite NaKLSX powder on a dry weight basis (2800 lbs. wet weight) were mixed with 22 lbs. F4M Methocel in a Littleford Ploughshare® mixer having an internal volume of 4,200 Liters for approximately 1 minute. Thereafter with the mixer still agitating, 359 lbs. IE-2404 (a silicone containing silicone resin emulsion from Dow Corning) diluted with 100 lbs. water was pumped in at a rate of 30 lb./min. The mixed powder product labeled hereinafter "the formulation" was transferred to a rotating pan granulation wheel. To start the granulation process a small fraction of clay-zeolite seed material was used to promote bead formation. The clay-zeolite seed amount used represented approximately 25% (by volume) of the total charge to the granulation wheel and the clay/zeolite NaKLSX content in seed was 12% clay, balance zeolite. The formulation was added to the clay-zeolite seeds under constant rotation of the pan granulation wheel. During this time water was added through a spray nozzle to promote particle agglomeration. The formulation addition and water addition was continued under constant rotation of the pan granulation wheel until beads including those in the target 16×20 mesh size range had formed. The beads having the target 16×20 mesh size were harvested by a screening process and sent to a storage hopper. The products in the storage hopper were then sent to a dryer and calciner wherein the temperature was staged from room temperature to 600° C. over a period of approximately 4 hours to remove any removable components and convert the silicone-derived binding agent to its final binding agent form. The products from the calcination step were rehydrated, Li ion exchanged and activated by methods described in the art. The final Li ion exchange level was greater than 98% on an equivalents basis and the residual moisture content of the final product was reduced below 0.3 wt % by the activation process, as measured by the Karl Fischer titration method.

Example D (Comparative)

LiLSX Zeolite Adsorbent with 12 wt % Clay Binding Agent, Commercial Scale Preparation A commercial LiLSX adsorbent product was obtained from Zeochem LLC, in 1.5 mm average bead size. The product contains 12 wt % of a clay binding agent and was ion exchanged with Li to greater than 96%.

Example E (Comparative)

LiLSX Zeolite Adsorbent with 7 wt % Clay Binding Agent, Commercial Scale Preparation A commercial LiLSX adsorbent product was obtained from Zeochem LLC, in 1.5 mm average bead size. The product contains 7 wt % of a clay binding agent and was ion exchanged with Li to greater than 98%.

Example F (Comparative)

LiLSX Zeolite Adsorbent with 7 wt % Silicone-Derived Binding Agent Using Dibasic Ester Solvent 2000.0 g of zeolite NaKLSX powder on a dry weight basis (2535.2 g wet weight) were mixed with 60.0 g F4M Methocel in a Hobart mixer for 1 hour. Thereafter with the mixer still agitating, 289.4 g of 233 Flake Resin (a silicone containing silicone resin from Dow Corning) dissolved in 434.1 g dibasic ester (DBE) was pumped in at rate of 14 ml/min. After the addition was completed, mixing was continued for 45 minutes. The mixed formulation was then transferred to a Nauta mixer having internal volume about 1 ft$^3$ and agitated therein at a speed of 9 rpm. The Nauta mixing was continued, while gradually adding deionized water to form beads having porosity in the range 35-40%, as measured after calcination using a Micromeritics Autopore IV Hg porosimeter. At the end of this mixing time, beads including those in the target 16×20 mesh size range had formed. The shaped beads were dried, and calcined to develop strength in the shaped adsorbent, in accordance with the teachings of U.S. Pat. No. 5,633,217.

The product beads were air dried overnight prior to calcination using the shallow tray method at temperatures up to 593° C., as described in Example 1. The calcined beads were subjected to a screening operation to determine the yield and harvest those particles in the 16×20 mesh size range for further processing to the Li ion exchanged and activated form as described in Example 2.

Example G. (Comparative)

LiLSX Adsorbent with 5 wt % Silicone Derived Binding Agent and Methocel F4M with Low Calcination Temperature 11.31 lbs. of the Ploughshare® mixed powder formulation from Example 4 was mixed with 1.41 lbs. F4M Methocel in a Simpson mixer-muller for 30 minutes, after which 3.0 lbs of water was added at a rate of 0.1 lb/min under constant mixing. At the end of the water addition, mixing was continued for an additional 5 minutes. The mixed powder product labeled hereinafter "the formulation" was transferred to a Nauta mixer having internal volume ~1 ft$^3$ and agitated therein at a speed of 9 rpm. The Nauta mixing was continued, while gradually adding 3.0 lbs. deionized water at a rate of 0.1 lbs./min. The formulation became dough-like and mixing was continued for 18 hours, which helped densify the dough to bring the porosity below 40%, in line with the inventive comparisons. The formulation was transferred to an LCI low pressure extruder (Model No. MG-55) equipped with a 1.5 mm die and extruded in axial geometry. The 1.5 mm diameter extrudate products were then dried and calcined in accordance with the teachings of U.S. Pat. No. 6,458,187. The shallow tray method in Example 1 was used with the maximum temperature adjusted to be 210° C.

The products from inventive examples 2-5 and comparative examples C-G were characterized by Hg porosimetry to measure in each case the median pore diameter, percentage of pores ≤0.1 μm and the hysteresis factor (see Table 3). The results show that only the inventive examples meet all of the Hg porosimetry criteria of the present, those being a median pore diameter equal to or greater than 0.45 μm, 10% or less of the macropores and mesopores are of less than or equal to 0.1 μm and a hysteresis factor of equal to or greater than 0.6 invention. For the comparative examples, at least one and in some cases all of these criteria are not met. In particular, for Comparative Example G, prepared following the teachings of U.S. Pat. No. 6,458,187 the Hg porosimetry data show that this sample has a very undesirable median pore diameter, fraction of pores less than or equal to 0.1 μm and hysteresis factor compared to the inventive examples.

Crush strengths for the inventive examples have also been measured and found to meet or exceed the y=1.2x−0.3 relationship wherein y is the crush strength in lbF and x is the mean particle diameter in mm. The crush strengths were measured using the method and equipment described in Table 2. In addition, $N_2$ capacity and $N_2$ pore diffusivities have been obtained for representative samples to show that the adsorbents described herein are high performance products for applications such as non-cryogenic air separation (Table 4). The $N_2$ capacity is determined at 760 Torr and 27° C. using a Micromeritics ASAP2050 Extended Pressure Sorption unit. The $N_2$ pore diffusivity ($D_p$) is calculated using the method and equipment described in Ackley et al U.S. Pat. No. 6,500,234 B1 and U.S. Pat. No. 6,790,260 B2. The Henry's Law $N_2/O_2$ selectivity is obtained by obtaining the Henry's Law constant for oxygen ($K_{HO2}$) and nitrogen ($K_{HN2}$) from isotherm data measured at 27° C. using a Micromeritics ASAP2050 Extended Pressure Sorption unit and dividing the $K_{HN2}$ by $K_{HO2}$ to obtain the selectivity).

TABLE 3

Hg Porosimetry and Crush Strength Results for Examples 2-5 and C-G

| Example | Binder (%) | [1]Mean Particle Diameter (mm) | [2]Porosity (%) | [2]MPD (μm) | [2]% Pores ≤ 0.1 μm F | [2]Hysteresis Factor R (Dim.) | [3]Crush Strength (lbF) |
|---|---|---|---|---|---|---|---|
| 2 | 5 | 1.54 | 38.0 | 0.59 | 6.7 | 0.8 | — |
| 3 | 5 | 1.60 | 41.0 | 0.72 | 6.4 | 0.9 | 1.7 |
| 4 | 5 | 1.71 | 37.9 | 0.66 | 7.4 | 0.9 | 1.9 |
| 5 | 5 | 0.99 | 36.0 | 0.65 | 4.5 | 0.6 | 1.1 |
| C | 7 | — | 38.1 | 0.33 | 21.5 | 0.5 | — |
| D | 12 | — | 38.0 | 0.33 | 23.5 | 0.5 | — |
| E | 7 | — | 36.8 | 0.33 | 21.0 | 0.3 | — |

TABLE 3-continued

Hg Porosimetry and Crush Strength Results for Examples 2-5 and C-G

| Example | Binder (%) | [1]Mean Particle Diameter (mm) | [2]Porosity (%) | [2]MPD (μm) | [2]% Pores ≤ 0.1 μm F | [2]Hysteresis Factor R (Dim.) | [3]Crush Strength (lbF) |
|---|---|---|---|---|---|---|---|
| F | 7 | — | 40.8 | 0.59 | 12.4 | 0.6 | — |
| G | 5 | — | 37.9 | 0.16 | 19.6 | 0.2 | — |

[1]Mean particle size is determined using a standard screening analysis method using 100 g of calcined material in a Ro-tap ® Sieve Shaker model RX-29 equipped with 8" diameter U.S.A. Standard mesh screens using 15 minutes of agitation.
[2]Porosity, median pore diameter (MPD), % pores ≤ 0.1 μm and hysteresis factor are determined as described above from Hg porosimetry data.
[3]Crush strength is measured on calcined products by the single bead method, using 40 beads from which the mean crush strength is calculated. All crush strength measurements employed a Dr. Schleuniger Pharmatron Tablet Tester 8M equipped with a 50N load cell.

TABLE 4

$N_2$ Capacity (27° C., 760 Torr), Henry's Law $N_2/O_2$ Selectivity (27° C.) and $N_2$ Pore Diffusivity ($D_p$) for Examples 2-5 and C-F

| Example | Binder % | $N_2$ Capacity (ml/g) | Henry's Law $N_2/O_2$ Selectivity | $D_p$ (m²/s) |
|---|---|---|---|---|
| 2 | 5 | 27.6 | 16.0 | $4.9 \times 10^{-6}$ |
| 3 | 5 | 28.4 | 16.1 | — |
| 5 | 5 | 26.0 | 16.3 | $4.2 \times 10^{-6}$ |
| C | 7 | 26.2 | 15.2 | $4.2 \times 10^{-6}$ |
| D | 12 | 23.8 | 15.7 | $2.8 \times 10^{-6}$ |
| E | 7 | 24.7 | 15.6 | $3.9 \times 10^{-6}$ |
| F | 7 | 15.9 | 13.9 | — |

A prerequisite for use of the silicone-derived binding agents is to ensure that the adsorbent is not damaged as a result of the binding agent and/or any components or solvents that are used with the binding agent. From the data in Table 4, it is clear that the inventive samples prepared with the silicone derived binding agents have superior capacities and selectivities to the samples prepared with traditional clay binding agents. These improvements are manifested at both laboratory and commercial production scales. Comparing lab made samples from inventive Examples 2 and 3 with a semi-commercially prepared comparative Example C, shows that the nitrogen capacities, and $N_2/O_2$ selectivities are superior for the inventive samples. Similarly, comparing the results for inventive Example 5 which was produced at commercial production scales with state of the art samples manufactured with clay binding agents, also prepared at commercial production scales (Comparative Examples D and E), again shows that the inventive samples have superior $N_2$ capacities and selectivities. A similar comparison of laboratory scale to laboratory scale and commercially produced to commercially produced shows that the inventive samples have superior $N_2$ pore diffusivities as well, versus the clay-based traditional adsorbents.

Comparison of the inventive examples with from a sample prepared following the teaching of U.S. Pat. No. 5,633,217 (Comparative Example F in Table 4) shows that the $N_2$ capacities and $N_2/O_2$ selectivity are inferior for this prior art formulation prepared using dibasic ester as a solvent. An X-ray diffraction pattern of Comparative Example F was recorded and compared to Example 1. From the comparison of the X-ray diffraction patterns, it is clear that the intensities of all peaks were diminished for Comparative Example F as compared to Example 1. This loss of intensity is a characteristic of structure damage or loss of crystallinity suggesting that the low silica zeolite X adsorbent sustained structural damage when compared to Example 1. Given that both adsorbent compositions used identical forming equipment, processing and thermal set points, the structural damage, and loss of crystallinity, was caused by the use of the dibasic ester solvent. Under hydrothermal conditions, such as those present during drying and calcination of adsorbent compositions, it is believed that dibasic ester compounds can decompose and form acidic species which can be harmful to low silica zeolites, such as those having $SiO_2/Al_2O_3$ ratios of less than 15, which have low resistance to acids.

One of the advantages of the use of the silicone-derived binding agent formulations, described herein is the ability to obtain products with good crush strength at very low binder contents, such as 5 wt %. The benefits associated with these low binder content silicone-derived binding agent formulations have been described with reference to Table 4 above. In order to show that some of the performance advantages of these new inventive formulations are not wholly due to the low binder content, we have normalized the capacity data presented in Table 4 for binder content in Table 5. The normalization is performed by multiplying the nitrogen capacity by 95/(100−7) for the samples in Table 4 with a 7 wt % binder content and by 95/(100−12) for the samples with 12 wt % binder content, where the numerator is the percentage of active adsorbent in the inventive samples and the denominator is the percentage of active adsorbent in the comparative samples.

TABLE 5

Binder Adjusted $N_2$ Capacity for Examples 2-5 and C-F

| Example | Binder % | [1]Binder Adj. $N_2$ Capacity (ml/g) |
|---|---|---|
| 2 | 5 | 27.6 |
| 3 | 5 | 28.4 |
| 5 | 5 | 26.0 |
| C | 7 | 26.8 |
| D | 12 | 25.7 |
| E | 7 | 25.2 |
| F | 7 | 16.2 |

[1]Where binder adjusted $N_2$ capacity is the $N_2$ capacity measured at 27° C., 760 Torr after normalization for binder content wherein for samples with 7 wt %, the measured $N_2$ capacity (see Table 4) is multiplied by 95/(100 − 7) and for the samples with 12 wt % binder content, the measured $N_2$ capacity (see Table 4) is multiplied by 95/(100 − 12)

Figure 4:
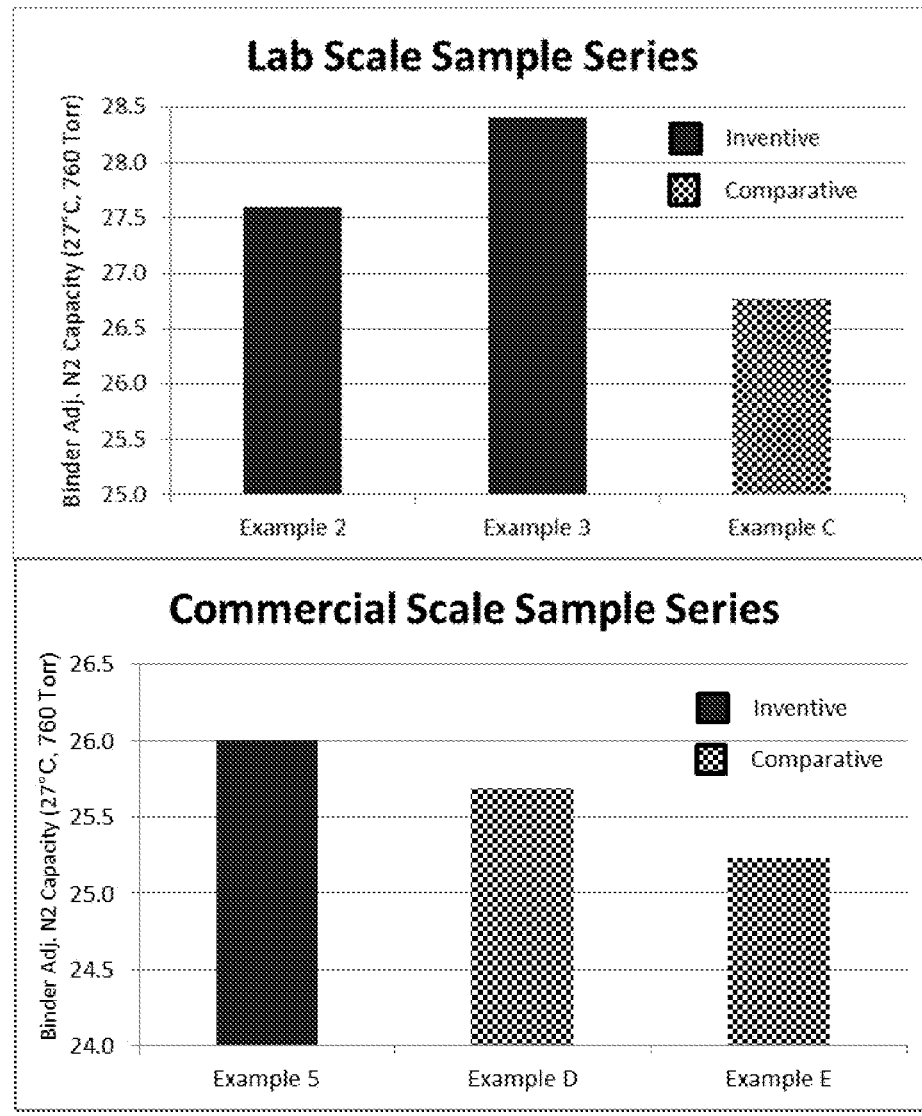
FIG. 4 is a graph of nitrogen adsorption capacities (27° C., 760 Torr) for commercial and lab prepared inventive and comparative samples.

In Table 5 and FIG. 4, comparing lab made samples from inventive Examples 2 and 3 with a semi-commercially prepared comparative Example C, shows that the binder adjusted nitrogen capacities, are superior for the inventive samples. Similarly, comparing the binder adjusted nitrogen capacities for inventive Example 5, which was produced at commercial production scales, with state of the art samples manufactured with clay binding agents, also prepared at commercial production scales (Comparative Examples D and E), again shows that the inventive samples have superior binder adjusted $N_2$ capacities. This is surprising since, the binder content differences have been accounted for by the normalization and suggests these higher than expected nitrogen capacities are a feature of the inventive adsorbent formulations.

It should be apparent to those skilled in the art that the subject invention is not limited by the examples provided herein which have been provided to merely demonstrate the operability of the present invention. The selection of appropriate adsorbent components and processes for use can be determined from the specification without departing from the spirit of the invention as herein disclosed and described. The scope of this invention includes equivalent embodiments, modifications, and variations that fall within the scope of the attached claims.

What is claimed is:

1. An adsorption process for separating $N_2$ from a gas mixture containing $N_2$ and at least one less strongly adsorbable component comprising contacting the mixture with an adsorbent composition which selectively adsorbs the $N_2$ and the at least one less strongly adsorbable component is recovered as product; the adsorbent composition comprising free-flowing agglomerated particles of a type X zeolite bound together by a silicone-derived binding agent and wherein the $N_2$ capacity of the composition is equal to or greater than 26 ml/g at 1 atm and 27° C.

2. The adsorption process of claim 1 wherein the process comprises a cyclic adsorption process for the separation of gases.

3. The adsorption process of claim 2 wherein the process is selected from the group consisting of a VSA, TSA, PSA, VPSA process and combinations thereof.

4. The adsorption process of claim 1 wherein the adsorbent composition exhibits a $N_2/O_2$ Henry's Law selectivity of greater than 15.8.

5. The adsorption process of claim 4 wherein the adsorbent composition further comprises a clay binder in concentrations of not more than 1 part clay binder to 5 parts silicone-derived binding agent.

6. The adsorption process of claim 4 wherein the zeolite has a $SiO_2/Al_2O_3$ ratio of less than or equal to 2.5.

7. The adsorption process of claim 6 wherein the zeolite includes a LiLSX or LiX zeolite.

8. The adsorption process of claim 1 wherein the silicone-derived binding agent is derived from a silicone binder precursor of the general formula $[R_2SiO]_n$, where R is one or more organic side groups selected from C1 to C8 organic compounds, including linear, branched and cyclic compounds or mixtures thereof and wherein the polymeric or oligomeric silicones are terminated by hydroxy, methoxy, ethoxy groups or mixtures thereof.

9. The composition of claim 8 wherein the silicone binder precursor is selected from the group consisting of an hydroxy, methoxy, or ethoxy terminated polymeric di-methylsiloxane or mixtures thereof with methyl-silsesquioxanes, octyl-silsesquioxanes, methyl octyl-silsesquioxanes, or mixtures thereof.

10. The adsorption process of claim 1 wherein the agglomerated particles have a median pore diameter of equal to or greater than 0.45 μm,
   a hysteresis factor of equal to or greater than 0.6, and
   a crush strength value of greater than that obtained from the value determined by the relationship y=1.2x−0.3 where y is the mean crush strength in lbF and x is the mean particle size in mm and the mean particle size range from 0.4 mm to 5.0 mm.

11. The process of claim 1 wherein the mean particle size of the agglomerated particles is from 0.6 to 1.8 mm.

* * * * *